(12) United States Patent
Blustein et al.

(10) Patent No.: US 9,021,044 B2
(45) Date of Patent: Apr. 28, 2015

(54) MODULAR INTELLIGENT POWER SYSTEM

(76) Inventors: David Tayvel Blustein, Thornhill (CA); Stylianos Derventzis, Ajax (CA); David Mauro Guido, Markham (CA); Mike Liwak, Pickering (CA)

( * ) Notice: Subject to any disclaimer, the term of this patent is extended or adjusted under 35 U.S.C. 154(b) by 154 days.

(21) Appl. No.: 13/418,880

(22) Filed: Mar. 13, 2012

(65) Prior Publication Data
US 2012/0239773 A1  Sep. 20, 2012

Related U.S. Application Data

(60) Provisional application No. 61/452,331, filed on Mar. 14, 2011.

(51) Int. Cl.
*G06F 15/16* (2006.01)
*H04L 12/28* (2006.01)

(52) U.S. Cl.
CPC ........ *H04L 12/2818* (2013.01); *H04L 12/2838* (2013.01); *H04L 2012/2841* (2013.01)

(58) Field of Classification Search
None
See application file for complete search history.

(56) References Cited

U.S. PATENT DOCUMENTS

| | | | |
|---|---|---|---|
| 5,486,725 A | 1/1996 | Keizer et al. | |
| 5,592,032 A | 1/1997 | Keizer et al. | |
| 5,734,206 A | 3/1998 | Keizer et al. | |
| 7,274,303 B2 | 9/2007 | Dresti et al. | |
| 7,964,989 B1 | 6/2011 | Puschnigg et al. | |
| 8,093,751 B1 * | 1/2012 | Puschnigg et al. | ............. 307/38 |
| 2003/0042796 A1 | 3/2003 | Siu | |
| 2006/0112179 A1 * | 5/2006 | Baumeister et al. | .......... 709/226 |
| 2006/0154642 A1 * | 7/2006 | Scannell, Jr. | ............... 455/404.1 |
| 2008/0141347 A1 * | 6/2008 | Kostiainen et al. | ............... 726/4 |
| 2009/0036159 A1 | 2/2009 | Chen | |
| 2009/0077405 A1 | 3/2009 | Johansen | |
| 2009/0077623 A1 | 3/2009 | Baum | |
| 2009/0165114 A1 | 6/2009 | Baum | |

(Continued)

FOREIGN PATENT DOCUMENTS

| | | |
|---|---|---|
| WO | WO 2012/080768 | 6/2012 |
| WO | WO 2012/080768 A1 | 6/2012 |

OTHER PUBLICATIONS

"The International Search Report and the Written Opinion of the International Searching Authority, or the Declaration for International Application No. PCT/CA2012/000220," dated Jun. 28, 2012.

*Primary Examiner* — Nicholas Taylor
*Assistant Examiner* — Clayton R Williams
(74) *Attorney, Agent, or Firm* — Brett A. Schenck; Walker & Jocke

(57) ABSTRACT

A system for monitoring or controlling conditions or apparatuses in a home, business or other suitable place is provided. The system includes a first master module that is operative to communicate with a device over an Internet network. The system further includes a server that is operatively connected to the device and the first master module. The server is operative to allow communication between the first master module and the device. The system also includes a first slave module operatively connected to the first master module. The first master module is operative to direct data between the first slave module and the server. The first slave module is operative to establish communication with the first master module through a plug and play connection. The device is operative to allow at least one of controlling and monitoring the first slave module through the server and the first master module.

21 Claims, 4 Drawing Sheets

(56) References Cited

U.S. PATENT DOCUMENTS

| | | |
|---|---|---|
| 2010/0044195 A1 | 2/2010 | Chiang et al. |
| 2010/0115624 A1* | 5/2010 | Coppinger ............... 726/27 |
| 2010/0138007 A1* | 6/2010 | Clark et al. ............. 700/90 |
| 2010/0152912 A1 | 6/2010 | Huang |
| 2010/0164299 A1 | 7/2010 | Lee et al. |
| 2010/0198713 A1* | 8/2010 | Forbes et al. ............ 705/34 |
| 2010/0205528 A1* | 8/2010 | Bavor et al. ............. 715/259 |
| 2011/0188420 A1* | 8/2011 | Filoso et al. ............ 370/311 |
| 2011/0288380 A1* | 11/2011 | Inciardi et al. ........... 600/301 |
| 2011/0314163 A1* | 12/2011 | Borins et al. ............ 709/227 |
| 2011/0320636 A1* | 12/2011 | Young et al. ............ 709/249 |
| 2012/0006700 A1* | 1/2012 | Geboers et al. .......... 206/216 |
| 2012/0028488 A1 | 2/2012 | Puschnigg et al. |
| 2012/0188083 A1* | 7/2012 | Miller, II ................ 340/573.1 |

* cited by examiner

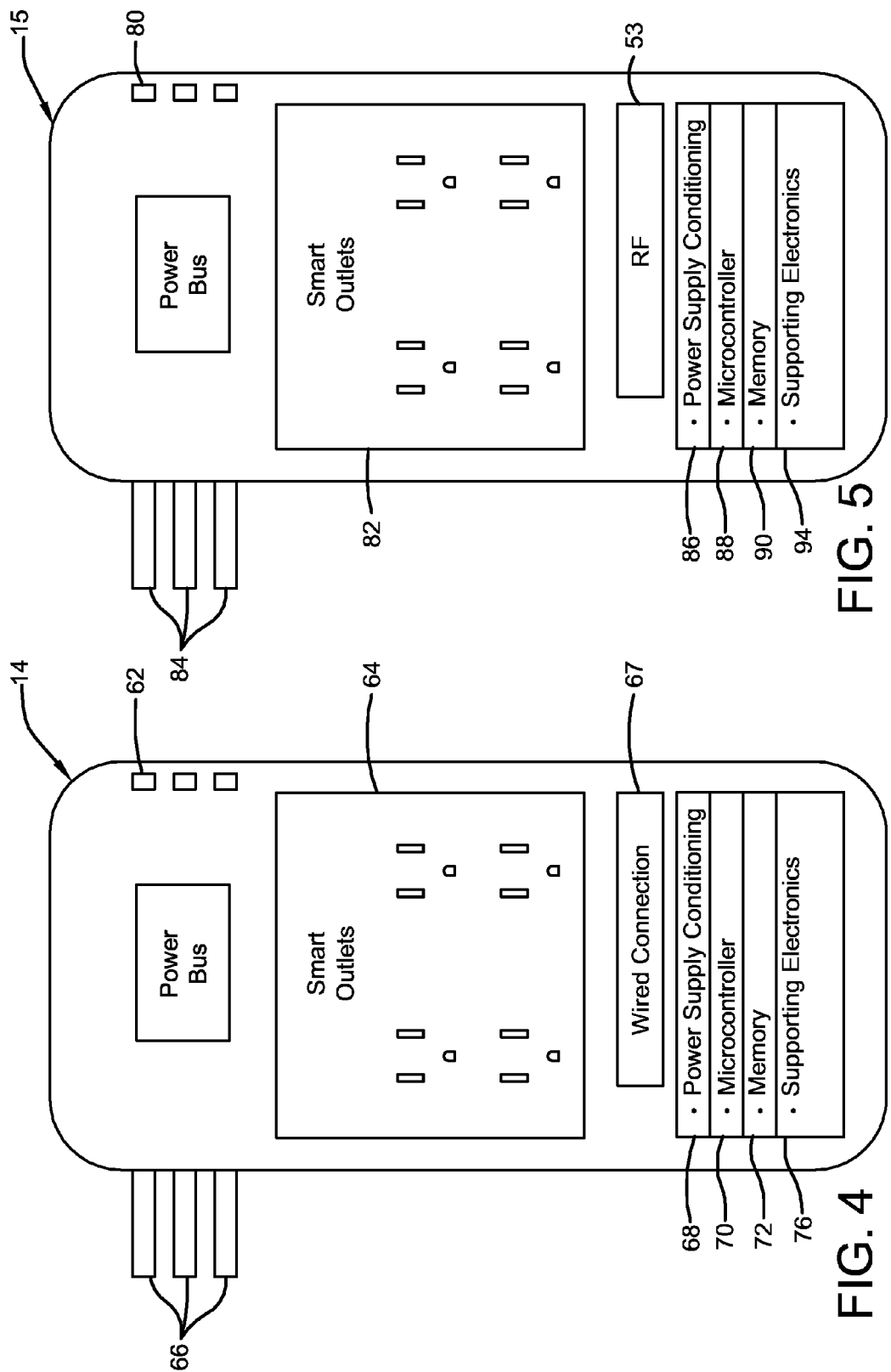

MODULAR INTELLIGENT POWER SYSTEM

CROSS-REFERENCE TO RELATED APPLICATIONS

This application claims benefit under 35 U.S.C. §119(e) of Provisional Application No. 61/452,331 filed Mar. 14, 2011, the disclosure of which is incorporated herein by reference in its entirety.

TECHNICAL FIELD

This invention relates to a modular intelligent power system that enables monitoring and controlling of electrical devices or conditions in a home, business or other suitable place that may be classified in U.S. Class 340, Subclass 3.1.

BACKGROUND ART

A system may be used to control or monitor electrical devices or conditions in a home or business. The system may display or otherwise indicate the condition of the device to a user and allow a user to control the devices. The system may also be controlled by a device remotely from the home or building in case, for example, the user is away from the home. For example, a system may use an iPhone to control the lights and temperature of a home as well as to monitor what devices are running and what lights are on or off. A system may also be set to monitor or control devices to conserve energy. For example, a building operator may have a remote system that monitors or controls devices primarily for energy conversation.

A system that monitors and controls electrical devices or conditions in a home, building or other suitable place may benefit from improvements.

OBJECTS OF EXEMPLARY EMBODIMENTS

It is an object of exemplary embodiments to provide an improved system for monitoring and controlling electrical devices or conditions in a home, business or other suitable place.

It is another object of exemplary embodiments to provide a system for monitoring and controlling electrical devices or conditions in a home, business or other suitable place having improved scalability.

It is a further object of exemplary embodiments to provide a system for monitoring and controlling electrical devices or conditions in a home, business or other suitable place that can utilize the internet.

It is a further object of exemplary embodiments to provide a system for monitoring and controlling electrical devices or conditions in a home, business or other suitable place that easily allows additional electronic and electrical devices to be added.

It is a further object of exemplary embodiments to provide a system for monitoring and controlling electrical devices or conditions in a home, business or other suitable place that saves space.

Further objects of exemplary embodiments will be made apparent in the following Detailed Description of Exemplary Embodiments and the appended claims.

The foregoing objects are accomplished in one exemplary embodiment by a system that includes at least a first master module. The first master module is operative to communicate with a device over a network (e.g (local area network (LAN) or a wide area network (WAN), such as the internet. The system further includes a server that is operatively connected to the device and the first master module. The server is operative to allow communication between the first master module and the device. The device may have a user interface. The system also includes at least a first slave module operatively connected to the first master module. The first master module is operative to direct data between the first slave module and the server. The first slave module is operative to establish communication with the first master module through a plug and play connection. The device is operative to allow at least one of controlling and monitoring the first slave module through the server and the first master module. The device may have an application/program installed on it that is the interface for the user to control and monitor the master and slave modules.

BRIEF DESCRIPTION OF THE DRAWINGS

FIG. 4 is a schematic view of a wired slave module of the exemplary modular intelligent power system of FIG. 1.

FIG. 5 is a schematic view of a wired slave module of the exemplary modular intelligent power system of FIG. 1.

DETAILED DESCRIPTION OF EXEMPLARY EMBODIMENTS

Figure 1:
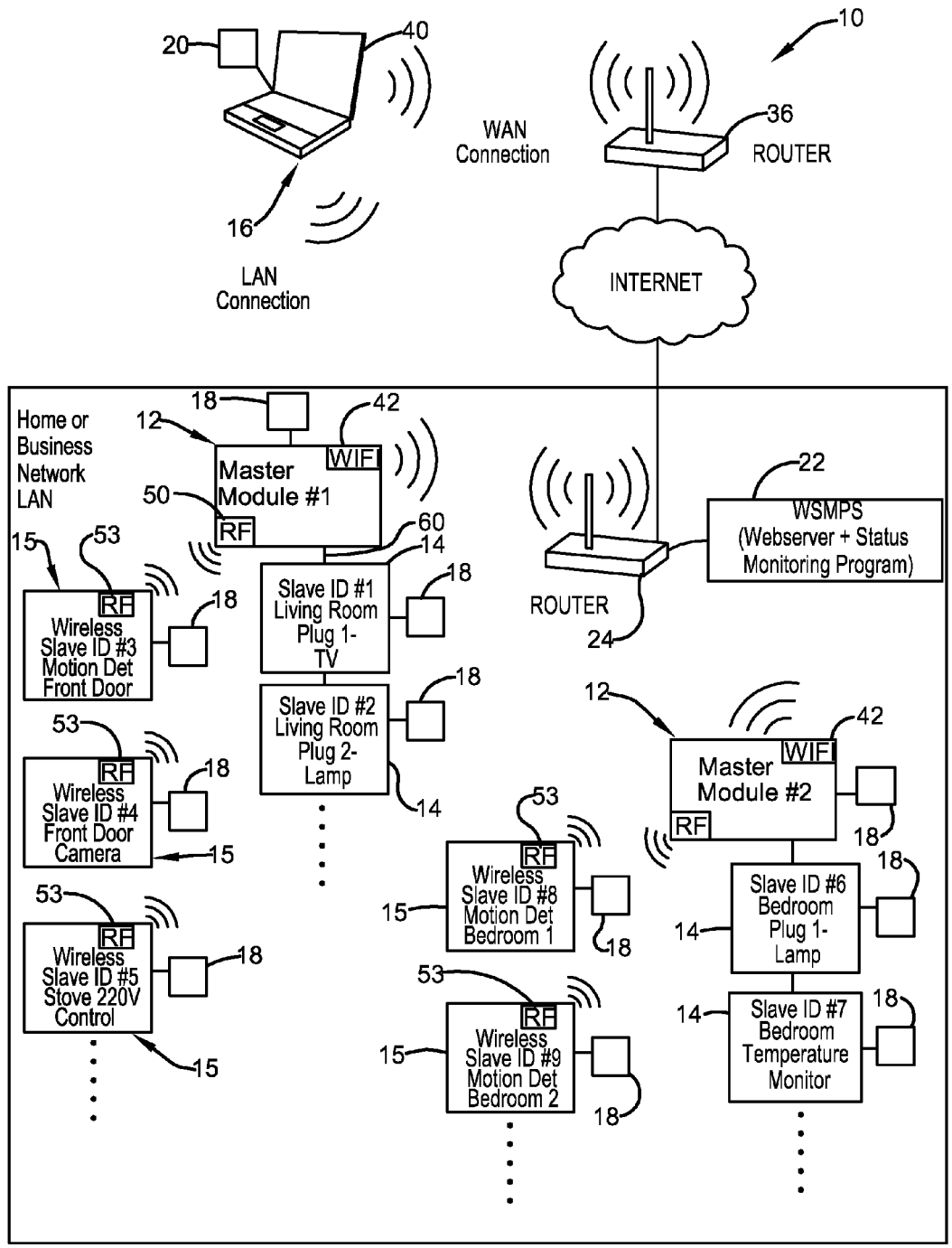
FIG. 1 is a schematic view of an exemplary modular intelligent power system.

FIG. 1 shows an exemplary embodiment of a modular intelligent power system or network (MIPS) 10. The system 10 includes modules 12, 14, 15 that are operative to monitor or control devices or conditions in a home business or other suitable place. These modules are do-it-yourself plug-and-play devices that can be plugged into power outlets 18 or otherwise easily mounted by a user without requiring an expert or specialist. In particular, the modules include master modules 12 and wired and wireless slave modules 14, 15. The slave modules are used to monitor or control the devices or conditions. The master modules 12 act as a gateway to route commands and data. The system 10 allows users to add additional modules to their home, business or other suitable place. These modules are in-turn controlled or monitored from any internet connected device 16 such as an iPod, cell phone, personal computer (lap top or desk top) or any device that has internet or network access. A graphical user interface in the form of a MIPS application 20 runs on the device 16 to allow the user to monitor and control the modules. The system 10 includes a webserver program and status monitor program server (WSMPS) 22 that may be operatively connected to a land area network (LAN) router or wireless router 24 in the home or businesses. The system 10 utilizes plug and play technology, which facilitates the discovery of a hardware component in a system, without the need for physical device configuration, or user intervention in resolving resource conflicts. In essence, plug and play technology allows the component to work automatically without having to do any technical analysis or manual configuration.

Figure 2:
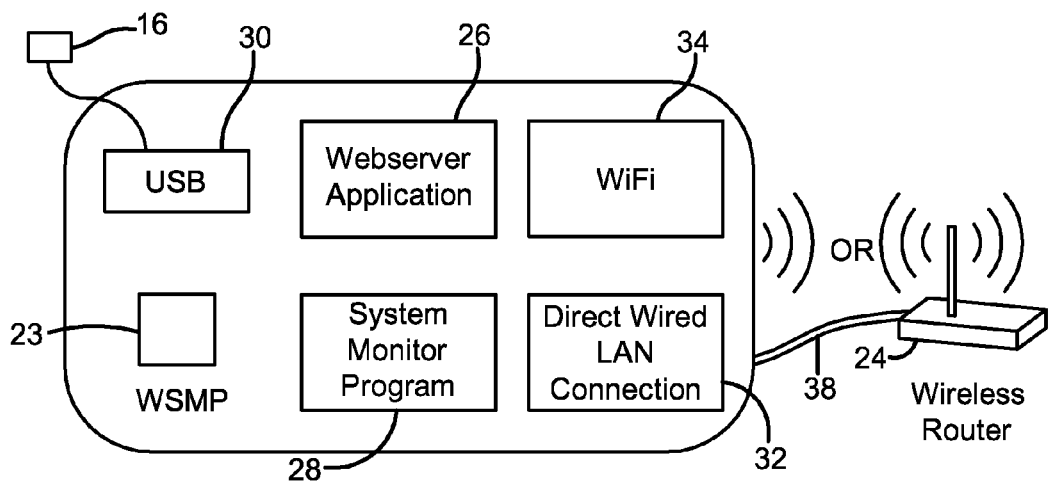
FIG. 2 is a schematic view of the WMPS and router of the exemplary modular intelligent power system of FIG. 1.

FIG. 2 shows the WSMPS 22 in more detail. The WSMPS 22 includes a webserver application 26, a system monitor program 28, and a connection 30 such as a USB connection.

Alternatively, the connection 30 could be a Firewire, Bluetooth, or other suitable connection for electrical devices. The WSMPS 22 further includes a direct wired connection port 32 and/or a WiFi connection port 34 for wireless connection. The webserver application 26 establishes network and internet connectivity with the wireless router 24 and provides an interface to connect to the MIPS application 20 running on the device 16. The WSMPS 22 may connect to the MIPS application via the local area network (LAN) or a wide area network (WAN). This network connectivity is established through a wireless router 36 in a plug and play manner.

The system monitor program 28 is used to monitor and control the modules. The system monitor program 28 continuously communicates with the modules. The system monitor program 28 polls the modules to obtain their status and performs monitoring operations. The system monitor program 28 may relay a request to one or more of the slave modules 14, 15 sent by the MIPS application 20 running on the device 16 to control the slave module. The system monitor program 28 may relay relevant data or status information of the slave module back to the MIPS application 20.

The USB connection port 30 may be used to allow connection of a computer or other suitable device to set up the WSMPS 22. The direct wired connection port 32 may be used to receive a wire or electrical cable 38 connected to the router 24 to connect the router 24 to the WSMPS 22. The WiFi connection port 34 provides a wireless connection of the WSMPS 22 to the router 24.

The WSMPS 22 also has a Media Access Control (MAC) address 23, which allows the WSMPS 22 to be recognized as a device on the network in a plug and play manner when the WSMPS 22 is connected to the router 24. Since the WSMPS 22 works with the router 24, security layers included in the router 24 also provide a secure connection between the MIPS application 20, wherever it is running, and the WSMPS 22. Once connected, the WSMPS 22 becomes part of the network in a seamless manner. Thus, the user does not need a high level of sophistication to setup this system. Communication is established over the network (LAN) or the internet (WAN) between the WSMPS 22 and the MIPS application 20 running on the internet connected device 16.

Referring back to FIG. 1, the MIPS application 20 establishes a connection to the MIPS network either from within the local area network (LAN) or remotely over the internet (WAN). The user would run it like most applications that run on a personal computer or embedded electronic device. The MIPS application 20 can be run on most operating systems such as Linux, Windows, Android, Embedded Windows, or other operating system used with personal computers or personal digital assisants. The MIPS application 20 allows for the control and monitoring of master and slave modules connected in the MIPS network. The data and status information from the modules is communicated to the MIPS application 20 in the devices. The MIPS application 20 processes and outputs the information in a graphical manner on an output device 40 such as the display screen on the lap top computer shown in FIG. 1. Alternatively or in addition, output devices such as indicator lights or audio output devices may be used.

The device 16 may be located remote to the MIPS network since connection may be through the internet. For example, the MIPS application 20 could be running on an iPod to allow a user to adjust settings, control modules, and receive alarms or other data. The user may control and monitor the modules by pressing soft buttons on the iPod. In another example, the MIPS application could be running on a cell phone, which has a touch screen. The user may control or monitor the modules by touching icons on the touch screen. The touch screen may display graphs or visual representations of the modules.

The MIPS application 20 also provides for a secure connection with the WSMPS 22, which in turn is always connected and communicating with the master and slave modules in the MIPS network. This allows for data and status information about the masters and slave modules to be updated continuously in the system monitor program 28 of the WSMPS 22. If commands are sent from the MIPS application 20 to the master and slave modules, the commands are first sent to the WSMPS 22 which updates data in the system monitor program 28 as required and then relays commands to the modules. It is possible that some data logging functions that retrieve higher amounts of data may require that data to only be saved on the personal computer or device running the MIPS application 20 instead of the system monitor program 28. When the MIPS application 20 is running it displays the Masters and Slaves modules and related data in a format that is easy to read. The MIPS application 20 allows the user to assign distinguishing descriptions of each module so that these modules are easy to discern when displayed in MIPS application 20. Some of the functions or services that the MIPS application 20 enables are dependent on the slave module type. These functions are further described in the section disclosing the types of slave modules.

A variety of MIPS application views may be displayed on the display screen or other output device. For example, the display screen 40 may show a setup view depicting the set up of the system. The display screen 40 may show an overall network view showing all master and slave modules. The display screen 40 may show a group view showing one master module and all the slave modules associated with the master module connected to the master module. The display screen 40 may show a detailed view of a master or slave module. The display screen 40 may show a monitoring/alarm view related to the modules. The display screen 40 may show a view of controls for controlling one or more of the modules. The display screen 40 may show a view of the data logged into the modules and data trends. The display screen 40 may show a view that allows a user to send emails or text alerts if there is an alarm condition. Of course, these are just exemplary views as other views may be created.

Figure 3:
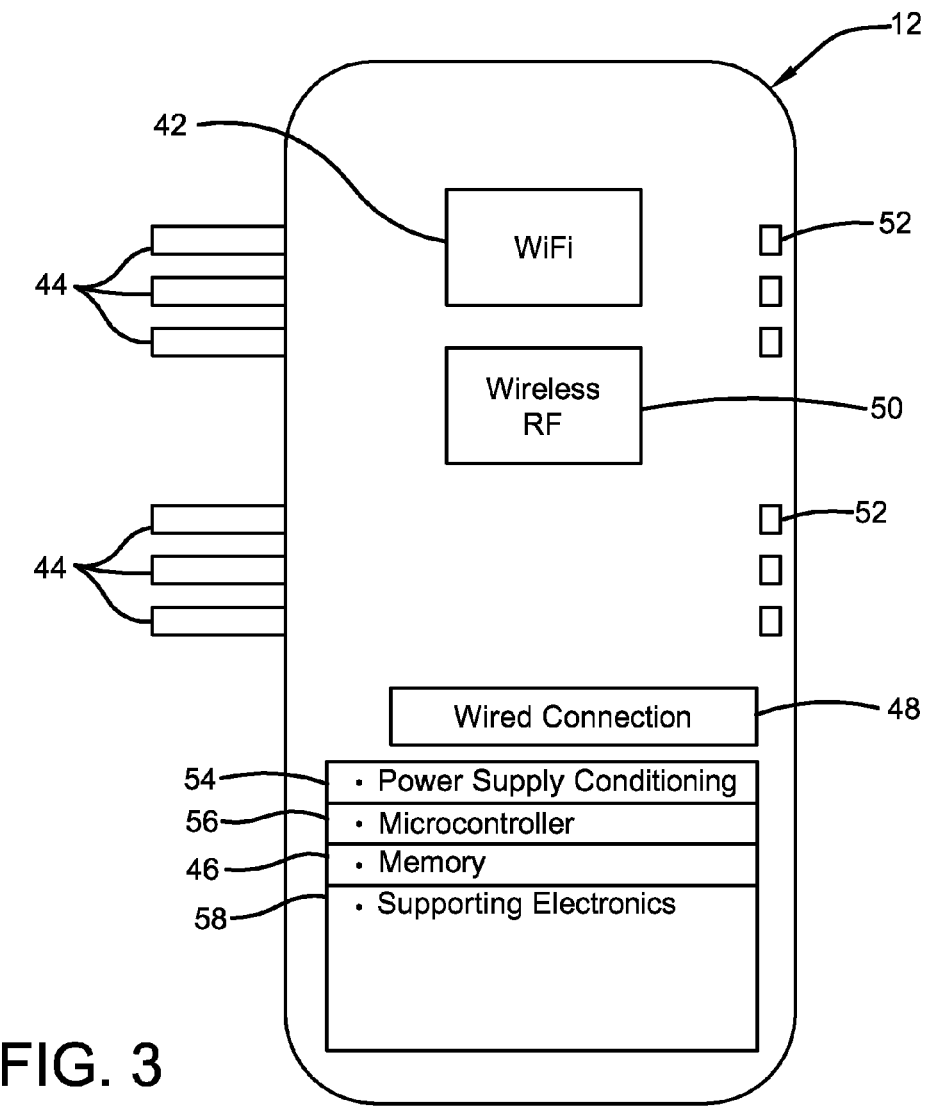
FIG. 3 is a schematic view of a master module of the exemplary modular intelligent power system of FIG. 1.

The WSMPS 22 communicates with master modules 12. As seen in FIGS. 1 and 2, on the front-end of each master module 12 is the WiFi connection port 42 that enables the master module 12 to be connected to the server within the predetermined range. Referring to FIG. 3, The master module 12 includes three prongs 44 that may be plugged into power outlets 18 such as an AC wall outlet throughout a home or business or other suitable place. The master module 12 may include another set of three prongs 44 for plugging into another outlet, since outlets are typically dual in homes and business. The master module 12 also includes a MAC address stored in a data store or memory 46 of the master module. The MAC address allows the MIPS network to recognize the master module 12 as a "plug and play" device. When the master module 12 is plugged into the power outlet 18, the master module 12 powers up and automatically negotiates with the MIPS network to recognize it as a "plug and play" device.

On the back-end of each master module 12 are two connection types for the slave modules 14, 15. The first type is a wired connection 48 for the communication bus of the wired slave modules 14. The second type is a wireless connection 50 for connection of the wireless slave modules 15. The wireless connection 50 utilizes a radio frequency (RF) platform such as Zigbee to communicate with the wireless slave module 15.

An array of slave modules may be connected to either the wireless connection 50 or the wired connection 48. The master module 12 also includes power outlets or electrical sockets 52 so as to serve as an outlet extension of the power outlet 18 that receives the master module 12. Therefore the functionality of the power outlet 18 is not lost when the master module 12 is plugged into it. The master module 12 may have a built in uninterruptible power supply (UPS) 54 or battery to supply power to devices connected to it when power to the power outlet 18 is not available such as in the case of a power failure. The master module 12 also includes a microcontroller 56 and supporting electronics 58.

The slave modules 14, 15 connect to the master modules 12 and establish communication with the master modules 12 by a plug and play type connection. The slave modules are controlled by the master module 12 connected to them. The user monitors and controls the slave modules 14, 15 via the device 16, which has the MIPS application 20 running on it. As previously mentioned, the slave modules may include wired slave modules 14 and wireless slave modules 15. One or more wired slave modules 14 are directly connected via a wire 60 to a master module 12. Referring to FIG. 4, each wired slave module 14 may include a power outlet 62 with integrated power monitoring, control, and other functionality (e.g motion detection or temperature monitoring). Each wired slave module 14 may include one or more smart outlets 64 for allowing electrical devices to be connected to the wired slave module 14. The wired slave module 14 includes three prongs 66 for insertion into a power outlet. This power outlet may be an AC wall outlet or other suitable power outlet 18 throughout a home or business or other suitable place. This power outlet may also be the power outlet 52 of the master module associated with the wired slave module 14. The wired slave module may also include a wired connection port 67 for wire 60. The wired slave module 14 may also have a built in uninterruptible power supply (UPS) 68 or battery to supply power to devices connected to it when power to the power outlet 18 is not available such as in the case of a power failure. The wired slave module 14 also includes a microcontroller 70, a data store or memory 72, a power bus 74, and supporting electronics 76.

The wired slave modules 14 may be a variety of types. For example, the wired slave module 14 may be an outlet controller as in FIGS. 4 and 5. This wired slave module includes two or three controllable outlets. An on/off control is provided on each outlet. A programmed on/off timer may be provided on each outlet to turn on or off power to the outlet at certain times. Multiple wired slave modules may be cascaded together to create a power strip with many outlets.

The outlet controller may also include a dimmer for each outlet to vary the power output of the outlet and hence the power to a device plugged into the outlet. For example, the dimmer may vary the power to a lamp plugged into the outlet and hence the brightness or intensity of the light output of the lamp. The outlet controller may also include monitoring circuits that monitor the voltage, current and power of the outlet controller. The outlet controller may process this information to improve energy consumption by cutting power to devices. For example, the outlet controller may cut off power to devices electrically coupled to the outlet controller that are off but still consume a small amount power (i.e. phantom power draw).

The wired slave module may include a motion detector and an outlet. The power to the outlet may be turned on and off in response to the motion detector detecting the motion of a person. For example, a night light plugged into the outlet or otherwise electrically coupled to the wired slave module may be turn on in response to the motion detector detecting the motion of a person. In another example, the wire slave module may send an alarm to the remote device in response to the motion detector detecting the motion of a person.

The wired slave module may include a temperature monitor and a controllable outlet. For example, the wired slave module may monitor the temperature in a room or of a stove or other appliance. The temperature may be displayed on the output device that runs the MIPS application 20. The wired slave module may send an alarm to the MIPS application 20 and WSMPS 22 in response to an undesirable temperature reading.

The wired slave module may include an A/V filtering power strip. The strip may include controllable outlets, noise filtering, surge suppression, power conditioning, and cable/video splitting. The wired slave module may send an alarm to the remote device upon detecting a surge suppression event. Multiple wired slave modules that include an A/V filter strip may be cascaded together to create a power strip with many power outlets 62.

As previously mentioned, the wired slave module may include an uninterruptible power supply (UPS), which provides a back-up power supply in case of a power loss. This wired slave module may be in a power strip format and can send an alarm message if there is a power loss condition or a power surge condition. Multiple slave modules of this type may also be cascaded together.

The wired slave module may be a wired lighted security camera. The module may include an area motion sensor, a light, and a digital camera. If the motion sensor is triggered, the slave module can send an alarm to the WSMPS 22 which in turn can send an alarm via SMS or an email to the device 16. The light may be activated for emergency lighting in response to the motion sensor detecting motion of a person. The light may also activate simultaneously with activation of the camera. The camera may provide images of the area proximate to the module and also provide fixed image capturing and recording. The camera may also rotate to allow up to 360 degree viewing. The camera may be remotely viewable through the internet device 16 via the WSMPS 22. The camera is programmable to capture and record for any time schedule. The camera may also work in sequence with the area motion sensor and light. For example, the light may activate and simultaneously, the camera starts recording for a predetermined time in response to the motion sensor detecting motion of a person in the vicinity of the module. This programming of the functions of this wired slave module may be preset and customized to perform a function at a single time or during regular intervals. The module may also be controlled by the user remotely in real time via the internet connected device 16.

The wireless slave modules 15 are connected to master modules 12 by a wireless protocol that utilizes the RF platform 53 such as Zigbee. Theses wireless slave modules 15 are typically related to various types of functionality such as smart outlet control/monitoring, motion sensing, temperature monitoring, and camera monitoring. As seen in FIG. 5, each wireless slave module 15 may include a power outlet 80 with integrated power monitoring, control, and other functionality (e.g motion detection or temperature monitoring). Each wireless slave module 15 may include smart outlets 82 for allowing electrical devices to be connected to the wireless slave module 15. The wireless slave module 15 may include three prongs 84 for insertion into a power outlet 18. This power outlet may be an AC wall outlet or other suitable power outlet 18 throughout a home or business or other suitable place. The wireless slave module 15 may also have a built in uninterruptible power supply (UPS) 86 or battery to supply power to devices connected to it when power to the power outlet 18 is not available such as in the case of a power failure. The wireless slave module 15 may also include a microcontroller 88, a data store or memory 90, a power bus 92, and supporting electronics 94.

The wireless slave modules 15 may also be a variety of types. For example, the wireless slave module 15 may be a motion sensor module. This module sends an alarm signal or message to the internet connected device 16 via the WSMPS 22 upon detection motion of an object such as a person. The WSMPS 22 can send a text or email in response to the alarm communication sent by this wireless slave module 15. Only a power connection is required for this module.

The wireless slave module may also be a camera module. This module includes a digital camera that can send still images or video wirelessly. The camera module may include a motion sensor. An alarm and picture or video can be transmitted to the internet connected device 16 via the WSMPS upon motion sensor detecting motion of an object such as a person. The wireless slave module may also be a safety module. This safety module includes a 220 v power plug interface into which a stove is plugged. One example of such a power plug interface is disclosed in U.S. Pat. No. 5,734,206, which disclosure is incorporated herein by reference in its entirety. The safety module integrates with the system by transmitting status information about the power drawn by the oven. The status information could include whether the stove is on or off and also the amount of power drawn. The module may send alarm messages to the internet connected device via the WSMPS based on the monitored state of the plug or power drawn. For example, if the power drawn is at a dangerous level, the safety module would send an alarm message regarding this condition to the internet connected device. The safety module could also turn on and off the stove.

The wireless slave module may be a moisture/water sensor module. This module monitors the moisture level of an area in the home, building, or other suitable place in order to detect flood or water leaks. The module sends an alarm if the moisture rises above a certain level. Alternatively, the module could send an alarm if the moisture falls below a certain level.

The wireless slave module may be a doorbell module. This module may send an alarm to the internet connected device 16 via the WSMPS 22 when a doorbell is rung. This module may be used in conjunction with a camera located near the doorbell to record an image or video in response to the door bell being rung.

The wireless slave module may be a garage door module. The module may allow the internet connected device to control the opening and closing of the garage door. The module could also send an alarm communication to the internet connected device via the WSMPS 22 if the garage door opens or closes.

The wireless slave module may be a wireless lighted security camera module. This slave module is configured to fasten to any standard light bulb socket. The module is powered through the electrical connection powering the light bulb socket. The module may include an area motion sensor, a light, and a digital camera. The motion sensor may send an alarm via SMS or an email to the internet connected device 16 via the WSMPS 22. The light may be activated for emergency lighting in response to the motion sensor detecting motion of a person. The light may also activate simultaneously with activation of the camera. The camera may provide images of the area proximate to the module and also provide fixed image capturing and recording. The camera may also rotate to allow up to 360 degree viewing. The camera may be remotely viewable through the internet device 16 via the WSMPS 22. The camera is programmable to capture and record for any time schedule. The camera may also work in sequence with the area motion sensor and light. For example, the light may activate and simultaneously, the camera starts recording for a predetermined time in response to the motion sensor detecting motion of a person in the vicinity of the module. This programming of the functions of this wireless slave module may be preset and customized to perform a function at a single time or during regular intervals. The module may also be controlled by the user remotely in real time via the internet connected device 16.

The wireless slave module may be a temperature monitor module. This module includes a temperature sensor that monitors the change in room temperature. The temperature sensor may be used to activate other modules such as a thermostat module to regulate the temperature in the room. Also, the temperature sensor may monitor unusual temperatures such as a very high temperature indicative of a fire.

The wireless slave module may be a baby monitor module. This module may include a microphone or other suitable device to monitor sounds coming from the baby. This module may also include a camera to provide images to the internet connected device for viewing and also record images of the baby. The microphone may be attached to the camera, so that image data and sonic data may be simultaneously viewed and recorded.

The wireless slave module may be a pill dispenser module. This module may be operatively connected to a pill dispenser to dispense a pill at a predetermined time. This module may also send a notification to the person receiving the pill that the pill is about to be dispense shortly.

The MIPS network 10 is set up as follows. First, the wireless router 24 is set up and then run. Next, a personal computer, such as that used as the internet connected device 16, is connected to the WSMPS 22 via the USB connection port 30 (FIG. 2). The personal computer will connect the WSMPS 22 via a standard Human Interface Device (HID) protocol. The WSMPS 22 will then start up in a setup mode. Then, the WSMPS 22 is connected to the wireless router 24. Alternatively, this step is not necessary if the wireless router 24 is integrated with the WSMPS 22. The personal computer then runs a setup application to communicate with the WSMPS 22 over the HID connection. This setup application could alternatively be part of the MIPS application 20. The WSMPS 22 is then setup with many of the settings automatically created and some of the network settings being established through Network Address Translation (NAT). The personal computer is then disconnected from USB connection port 30 of the WSMPS 22. The WSMPS 22 is now up and running as part of the network. Through the WSMPS setup, the WSMPS 22 can either be made visible in the local network (LAN) or externally through the internet (WAN). Any internet access device 16 (e.g cell phone, PDS, iPod, laptop computer, desktop computer) that has the MIPS Application running on it can now make a secure connection to the WSMPS 22.

After the WSMPS 22 is set up, master modules 12 can be added to the network by plugging them into the power outlets 18. Since each of the master modules has a MAC address and is WiFi enabled, the module may be added to the MIPS network in a similar fashion as adding any type of network device with an automatic connection established. Once the master module 12 is setup on the network, the module becomes visible to the WSMPS 22 and in turn to the MIPS Application running on the internet connected device 16. Via the MIPS application 20, the master module 12, which was just connected, can be configured by the user. For example, the user may add a group name that describes the master module. The master module may also have a USB port for connection to the personal computer or other suitable device that may be used to manually set up the master module. This manual setup may done, for example, in case the automatic plug and play connection does not work.

Figure 6:
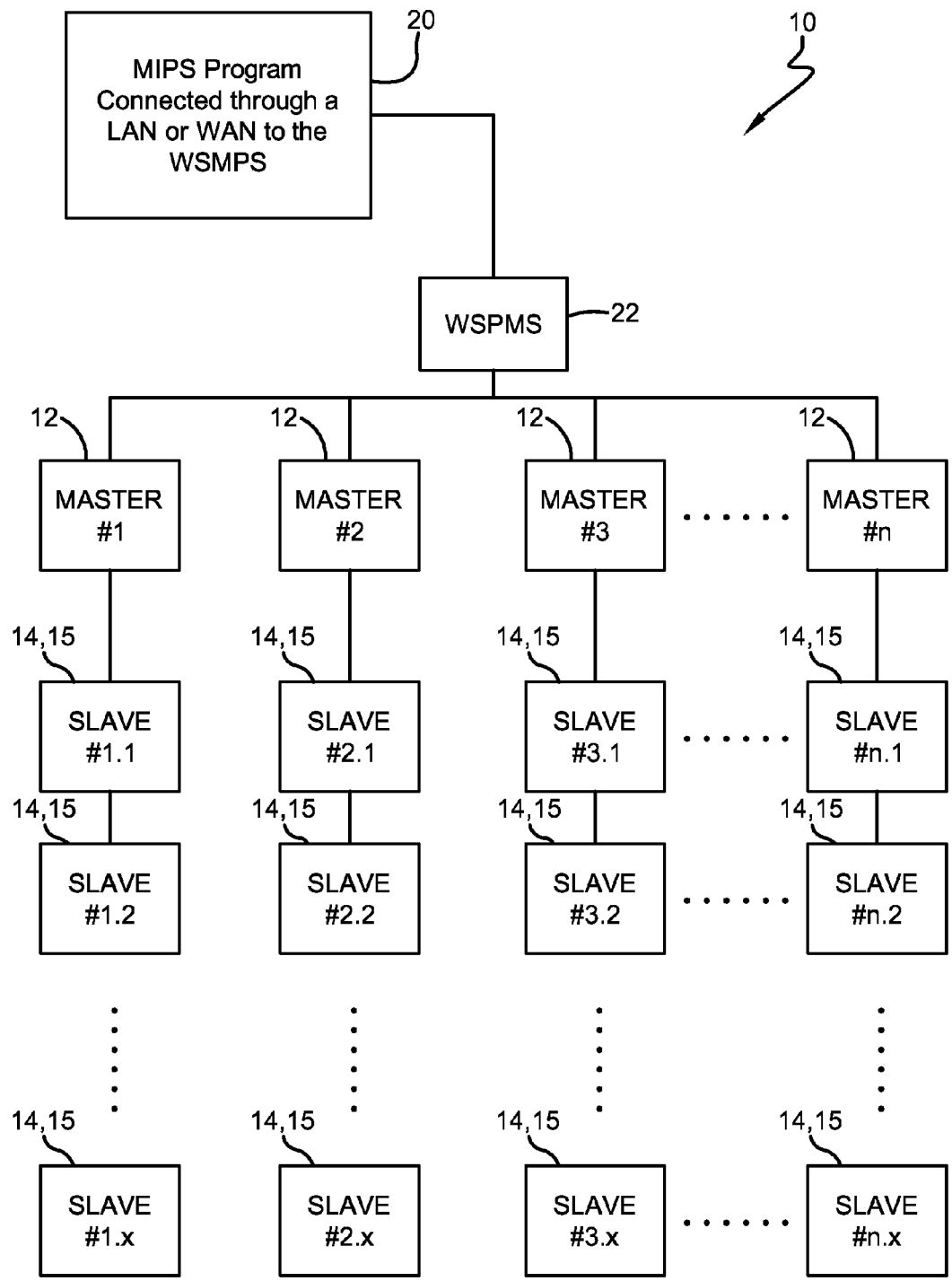
FIG. 6 is a schematic representation of an exemplary modular intelligent power system of FIG. 1 illustrating the topology of the system.

After the master modules 12 are added, the slave modules 14, 15 may be added to the MIPS network 10. One or more slave modules may be associated with a master module. To add a slave module, the master module is placed in a setup mode and then the slave module is plugged into the power outlet. One or more master modules can be placed in the setup mode. However, to avoid network conflicts, it is desirable to have one master module be placed in the set up mode. As illustrated in FIG. 6, the MIPS network may include any number of master modules and any number of slave modules associated with a master module. The WSMPS 22 can connect to these multiple master modules as shown in FIG. 6. When the slave module is initially powered up, the module automatically looks for its corresponding master module. The slave module establishes communication with the master module, when the slave module finds the master module. In particular, each of the slave modules are pre-set with a unique ID. If this ID corresponds to the same ID stored in the data store 46 of the master module, the master module automatically establish a connection with that slave module as a unique device. In essence, these slave modules associated with the master module are sub-addresses of that master module. During this process, the WSMPS 22 is also automatically updated so that the added slave module may be added to the MIPS network. Any communication between the WSMPS and the MIPS application will now include the newly added slave module.

The user may view a display of each slave module in a display screen of the device 16 via the MIPS application 20. A meaningful description may also be associated with each slave module when displayed in the MIPS application 20. Each slave module is paired with one master module. After the slave modules are setup, the master module is returned to normal operating mode. The slave modules may be reset by a reset button, personal computer, or any other suitable mechanism. The wired slave modules 14 may be plugged into each other in series. For example, multiple wired slave modules may be plugged into one master module enabling multiple plug outlets that can be controlled or monitored. Similarly, multiple wireless slave modules may be operatively connected to a master module creating a group of wireless slave modules that can be controlled or monitored.

Once the slave modules are up and running in the MIPS network 10, they can be controlled and monitored. For example, the advanced outlet controller module may measure and monitor current, voltage, and power. This information may be monitored and logged by the WSMPS 22 or by the MIPS application 20. Energy usage over time could be monitored. In the MIPS application 20, the user can setup "action events" based on the monitored data, such as to turn off the plug/outlet when a certain power draw is reached or to send a warning/alert if the voltage drops below an alarm level. In the MIPS application 20, the user can also manually control the outlet: turn it on or off, or lower the voltage (to dim a light for example).

Timed events can also be created, such as to turn on or off the power plug outlet at a certain time or date. Of course, these are just some examples. Other slaves that have different functionality will allow different monitoring and control actions. Emails or text messages can be generated to further enhance the alarm notification for the user.

The user running the MIPS Application may see the slave modules displayed in the graphical interface, with each slave module identified by a common description that the user defines. For example, the user might set the description "Bedroom Plug #1—Lamp". They could then "click" on that icon representing that slave module viewed in the display screen 40. This action would open a monitoring and control window. In this window, the power usage may be monitored, the on/off state of the plug may be monitored and controlled, and the dimming level may be set. Other functions and parameters related to controlling and monitoring the lamp could be set up and displayed.

This MIPS system has several desirable features. The MIPS system combines multiple technologies into a unique system architecture. Users only need to add additional functional modules as desired, and that added functionality is compatible across all MIPS modules. The modules can be added without infrastructure changes. Further, individual modules are small and thus require little space. A system can be built with certain modules and expand and enhanced later on. When multiple modules are connected together they will be similar in size to standard power strips. The MIPS also is a scalable platform of various modules that can all work together.

In essence, the MIPS functions well when additional modules are added or removed in order to meet a user need.

Thus exemplary embodiments achieve at least some of the above stated objectives, eliminate difficulties encountered in the use of prior devices and systems, solve problems, and attain the desirable results described herein.

In the foregoing description, certain terms have been used for brevity, clarity, and understanding, however, no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art as being capable of performing the recited function, and shall not be deemed limited to the particular means shown in the foregoing description or mere equivalents thereof. The provisions of an Abstract herewith shall not be construed as limiting the claims to features discussed in the Abstract.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

What is claimed is:

1. A system comprising:
   at least one first master module, wherein the at least one first master module includes circuitry that is operative to communicate with a user interface device over an internet network;
   a server, wherein the server is operatively connected to the user interface device and the at least one first master module, wherein the server is operative to allow communication between the at least one first master module and the user interface device;
   at least one first slave module operatively connected to the at least one first master module, wherein the at least one first master module is operative to direct data between the at least one first slave module and the server, wherein the at least one first slave module includes circuitry that is operative to automatically establish communication with the at least one first master module through a plug and play connection;

wherein the user interface device is configured to enable the at least one first slave module to be at least one of controlled, monitored, or any combination thereof, through operation of the server and the at least one first master module; and wherein the at least one first slave module includes at least one power outlet, wherein the user interface device is configured to selectively enable the user interface device to at least one of control, monitor, or any combination thereof, power to the at least one power outlet of the at least one first slave module through operation of the server and the at least one first master module, wherein the at least one first slave module further includes at least one smart outlet configured to enable connection of electrically powered items to be operatively connected to the at least one first slave module.

2. The system of claim 1 wherein the at least one first master module includes circuitry that is operative to establish a plug and play connection with the server.

3. The system of claim 1 wherein the user interface device includes a cell phone, personal computer, personal digital assistance, iPod or any combination thereof.

4. The system of claim 1 and further including at least one second slave module operatively connected to the at least one first master module, wherein the at least one first master module is operative to direct data between the at least one second slave module and the server, wherein the at least one second slave module is operative to establish communication with the at least one first master module through the plug and play connection.

5. The system of claim 4 wherein the user interface device is configured to control the at least one second slave module in response to receiving data from the at least one first slave module.

6. The system of claim 1 and further including a router, wherein the server is operatively connected to the router.

7. The system of claim 1 wherein the server includes a system monitor application, wherein the system monitor application is operative to poll the status of the at least one first master module and the at least one first slave module.

8. The system of claim 7 wherein the system monitor application is operative to cause the server to perform monitoring operations on the at least one first master module and the at least one first slave module.

9. The system of claim 7, wherein the system monitor application is operative to cause the server to relay a request sent from the user interface device to the at least one first slave module, wherein the request is to cause the user interface device to control the at least one first slave module.

10. The system of claim 1 wherein the user interface device includes a graphical interface application.

11. The system of claim 1 wherein the at least one first slave module includes a baby monitor.

12. The system of claim 1 wherein the at least one first slave module includes a pill dispenser, wherein the user interface device is operative to monitor time that the pill dispenser dispenses a predetermined number of pills.

13. The system of claim 1 wherein the server includes a media access control address, wherein the media access control address is utilized to allow the server to be recognized as a device on the system when the server is connected to the system.

14. The system of claim 1 wherein the at least one first master module includes at least one power outlet, wherein the at least one first slave module is operative to be plugged into the at least one power outlet of the at least one first master module.

15. The system of claim 1 wherein the at least one first slave module is wirelessly connected to the at least one first master module.

16. The system of claim 1 wherein the at least one first master module includes at least one plug that is operative to be plugged into a first power outlet, wherein the at least one first master module includes a second power outlet that is configured to serve as an outlet extension of the first power outlet, wherein the at least one first slave module includes at least one plug that is operative to be plugged into the second power outlet of the at least one first master module.

17. The system of claim 1 wherein the user interface device is operative to selectively enable control of power to the at least one power outlet of the at least one first slave module through communication via the server and the at least one first master module.

18. The system of claim 1 wherein the user interface device includes a display screen, wherein the display screen is operative to display data from the at least one first slave module.

19. The system of claim 1 and further including at least one second master module, wherein the at least one second master module includes circuitry that is operative to communicate with the user interface device over an internet network, wherein the server is operatively connected to the user interface device and the at least one second master module, wherein the server is operative to allow communication between the at least one second master module and the user interface device;

at least one second slave module operatively connected to the at least one second master module, wherein the at least one second master module is operative to direct data between the at least one second slave module and the server, wherein the at least one second slave module includes circuitry that is operative to establish communication with the at least one first master module through a plug and play connection;

wherein the user interface device is configured to selectively enable the at least one second slave module to be at least one of controlled, monitored, or any combination thereof, through communication of the server and the at least one second master module; and wherein the at least one first master module is operatively associated with the at least one first slave module in a home or business location, wherein the at least one second master module is operatively associated with the at least one second slave module in the home or business location.

20. A system comprising:

at least one first master module, wherein the at least one first master module includes circuitry that is operative to communicate with a user interface device over an internet network, wherein the at least one first master module is configured to be operatively connected to a server, wherein the server is configured to be operatively connected to the user interface device, wherein the server is operative to allow communication between the at least one first master module and the user interface device;

at least one first slave module operatively connected to the at least one first master module, wherein the at least one first master module is operative to direct data between the at least one first slave module and the server, wherein the at least one first slave module includes circuitry that is operative to establish communication with the at least one first master module;

wherein the user interface device is configured to enable the at least one first slave module to be at least one of selectively controlled, monitored, or any combination thereof, through communication of the server and the at least one first master module;

wherein the at least one first master module is configured to be plugged into a first power outlet, wherein the at least one first master module includes a second power outlet that is configured to serve as an outlet extension of the first power outlet, wherein the at least one first slave module is configured to be plugged into the second power outlet of the at least one first master module; and wherein the at least one first slave module includes circuitry that is operative to automatically establish communication with the at least one first master module through a plug and play connection.

21. A system comprising:

at least one first master module, wherein the at least one first master module includes circuitry that is operative to communicate with a control device over an internet network, wherein the at least one first master module is configured to be operatively connected to a server, wherein the server is operatively connected to the control device, wherein the server is operative to enable communication between the at least one first module and the control device;

wherein the at least one first master module is configured to plug into at least one first power outlet;

wherein the at least one first master module includes at least one second power outlet;

wherein the control device is configured to selectively control power delivery to the at least one second power outlet of the at least one first master module via communication through the server and the at least one first master module;

at least one second master module, wherein the at least one second master module includes circuitry that is operative to communicate with the control device over the internet network, wherein the at least one second master module is configured to be operatively connected to the server, wherein the server is operatively connected to the control device, wherein the server is operative to enable communication between the at least one second master module and the control device;

wherein the at least one second master module is configured to plug into at least one third power outlet; wherein the at least one second master module includes at least one fourth power outlet; wherein the control device is configured to selectively control power delivery to the at least one fourth power outlet of the at least one second master module via communication through the server and the at least one second master module;

wherein both of the first and second master modules are operatively associated with other electrically controlled items in a single home or business location;

at least one first slave module operatively connected to the at least one first master module; and wherein the user interface device is configured to enable the at least one first slave module to be at least one of controlled, monitored, or any combination thereof, through operation of the server and the at least one first master module.

* * * * *